March 27, 1962     F. P. BROWNE     3,026,633

MULTIPLE DISPLAY PLOTTING SYSTEM

Filed May 15, 1959     4 Sheets-Sheet 1

INVENTOR
FRANCIS P. BROWNE

BY

ATTORNEY

March 27, 1962  F. P. BROWNE  3,026,633
MULTIPLE DISPLAY PLOTTING SYSTEM
Filed May 15, 1959  4 Sheets-Sheet 2

INVENTOR
FRANCIS P. BROWNE

BY

ATTORNEY

March 27, 1962 F. P. BROWNE 3,026,633
MULTIPLE DISPLAY PLOTTING SYSTEM
Filed May 15, 1959 4 Sheets-Sheet 3

INVENTOR
FRANCIS P. BROWNE

BY *A. Fredrick Hamann*

ATTORNEY

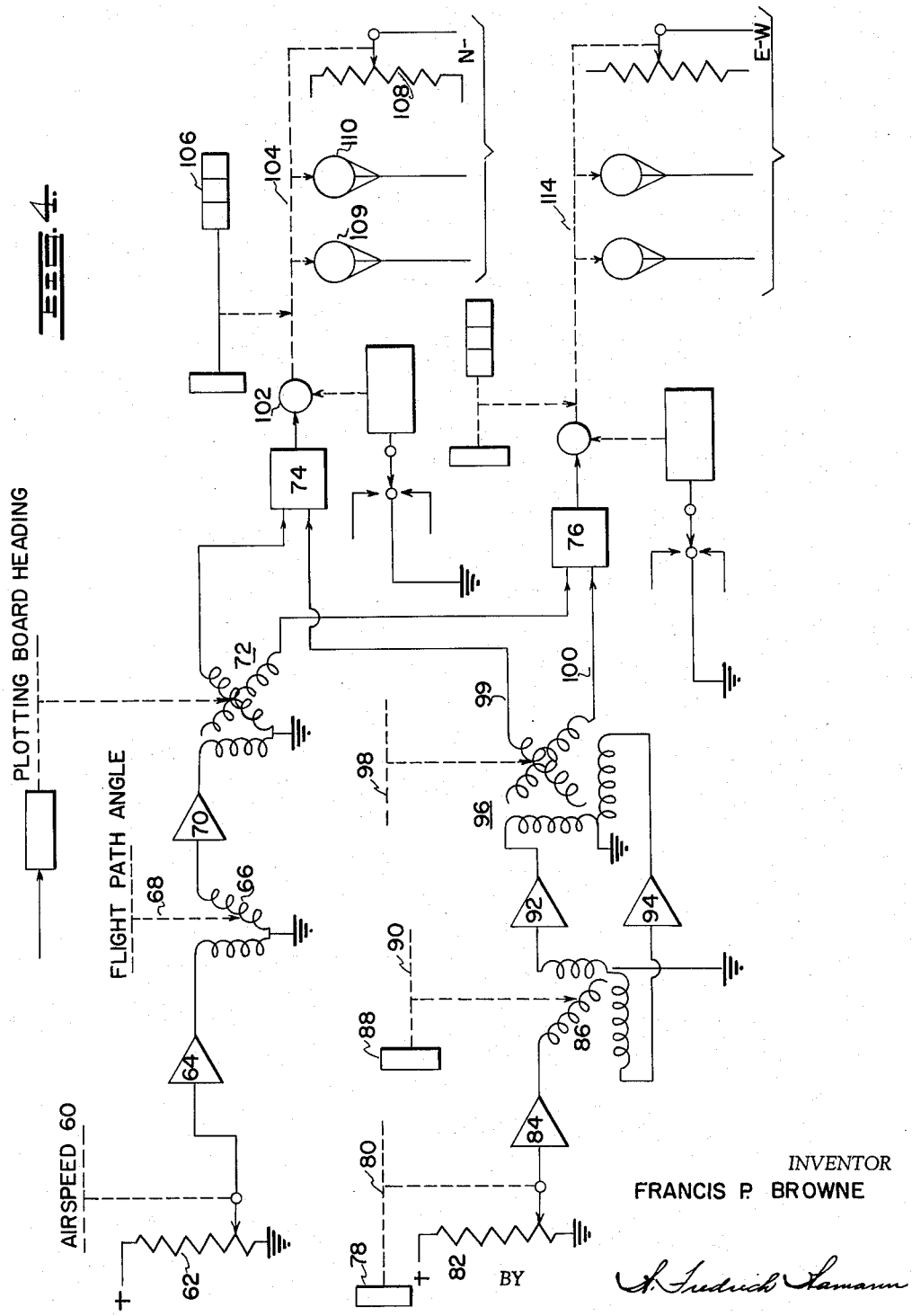

United States Patent Office 3,026,633
Patented Mar. 27, 1962

3,026,633
MULTIPLE DISPLAY PLOTTING SYSTEM
Francis P. Browne, Silver Spring, Md., assignor to ACF Industries, Incorporated, New York, N.Y., a corporation of New Jersey
Filed May 15, 1959, Ser. No. 813,380
3 Claims. (Cl. 35—12)

This invention relates to flight simulators and, more particularly, to plotting board apparatus for displaying on one display surface, separate forms of indicia to two or more observers.

In conventional flight simulators wherein both the pilot and crew members are being trained simultaneously a display containing information pertinent to the pilot and crew controls is needed by the flight instructors to properly evaluate the pilot and crew skill of performance in completing a mission. For instance, to evaluate the flight tactics of a pilot an instructor is interested in the relative position of the aircraft with respect to other check points, such as point of take off, destination and targets. To evaluate the ability of a navigator an instructor should have some display available to him of the aircraft's position in relationship to navigational radio beams and other navigational check points, such as radio stations and fan markers. To display the information needed from these two or from other sources of training, a conventional flight simulator requires the use of two or more plotting boards to illustrate or to monitor the events which occur during training phases. It is to the elimination of this need for a plurality of plotting boards or surfaces that this invention is directed.

It is, therefore, a broad object of this invention to provide display apparatus capable of displaying a multiplicity of navigational charts and plots in such a manner as to convey some information to one observer while conveying other information to a second observer.

It is a further object of this invention to provide plotting surface capable of monitoring two separate phases of flight training activity and to display them on a single plotting surface so that each phase is visible to only one of two instructors.

It is a further object of this invention to provide a single plotting surface upon which a plurality of individually viewed events may be displayed.

The objects of the invention are realized by utilizing a viewing screen fabricated of many lenticular lenses. Navigational charts made up of line structures adhered to the rear surface of the viewing screen will be focused and magnified by the lenses. The lines and, hence, the charts seen will depend on the viewing angle as illustrated in FIG. 5.

The novel features of the invention are set forth in the appended claims and the invention as to its organization and its mode of operation will best be understood from a consideration of the following detailed description of the preferred embodiment when used in connection with the accompanying drawings which are hereby made a part of the specification and in which:

FIG. 4 is a schematic illustration of an aircraft position computer which may be used in FIG. 3.

FIG. 8 illustrates an alternate method using the black line principle of construction for the viewing screen.

The preferred embodiment of this invention provides a plotting board or viewing screen apparatus by which two persons may view the recording of two separate events without interference or distraction from the other display.

Figure 1:
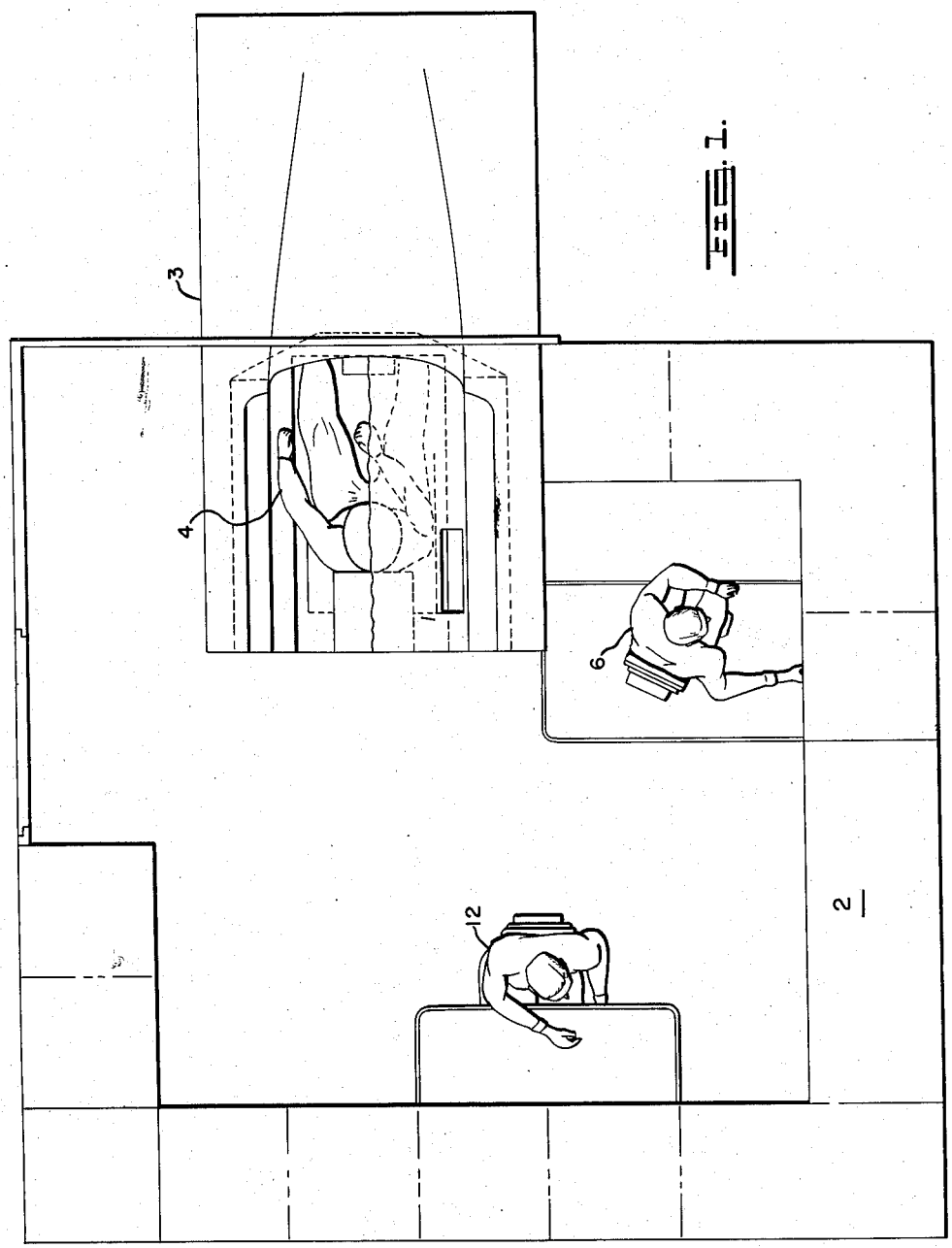
FIG. 1 is a top view of an aircraft pilot trainer.

In the following detailed description of the apparatus by which the objects of the invention are realized the plotting apparatus 2 of FIG. 1 is utilized to record the progress of the simulated flight which is carried on by the student pilot 4 who is seated within the cockpit structure 3. Movement of the flight controls by the pilot 4 activates computers so as to alter the relative position of the simulated aircraft with respect to the ground, to radio stations, and other targets. It is to the monitoring of the aircraft's flight position that one instructor 6 is assigned. From his position, the instructor 6 may view the plotting apparatus 2 so as to instantly note the position of the simulated flight with respect to other check points or areas of interest.

Figure 2:
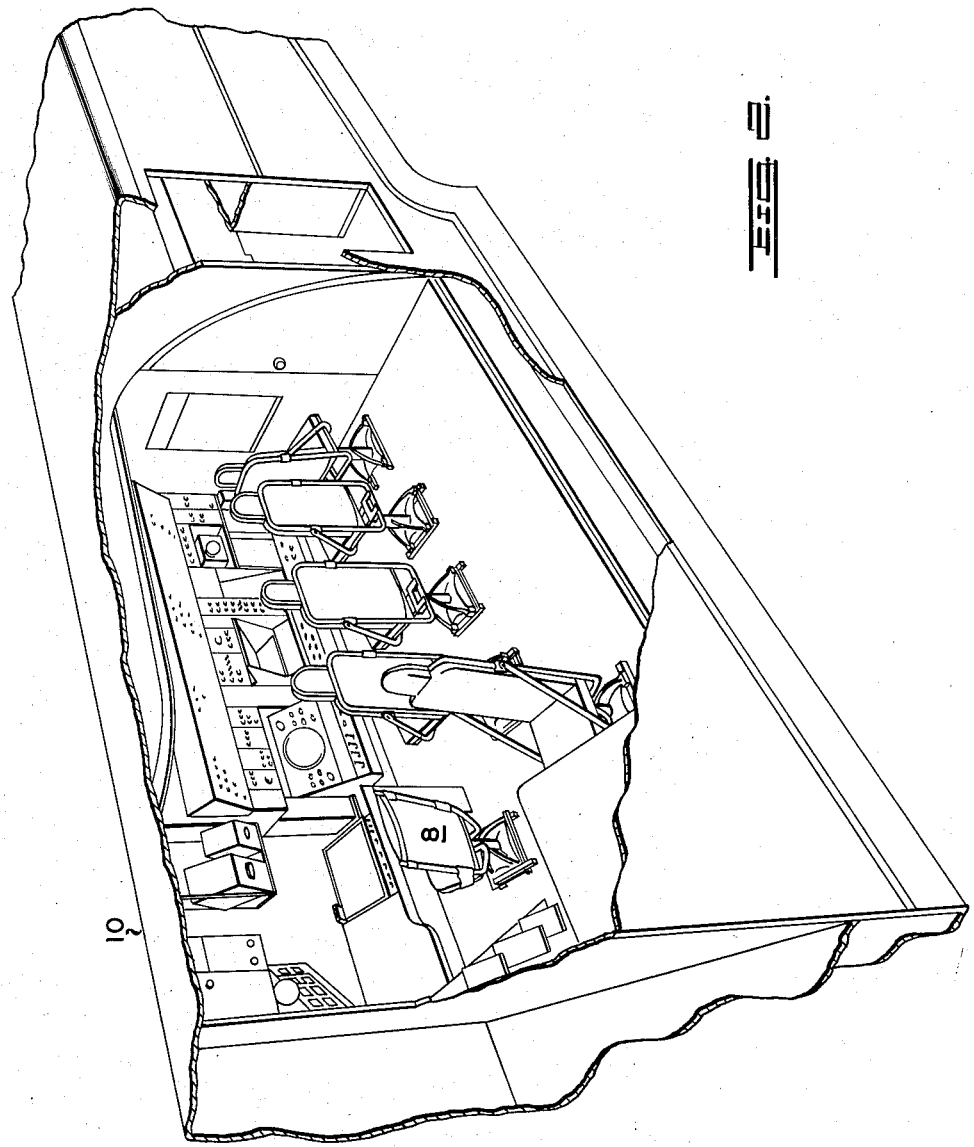
FIG. 2 is a cutaway view of the crew stations of a large aircraft trainer.

The navigation of a large aircraft is usually the responsibility of the navigator whose position 8 in the crew trainer of housing 10 of FIG. 2 allows him to observe maps of the flight areas and to monitor flight velocity and bearing. An instructor 12 of FIG. 1 is positioned so as to monitor the results of the crew activity while observing instruments before him and the plotting apparatus 2. It is therefore seen that both instructors 6 and 12 are in need of flight information which involves the aircraft's position. The instructor 12, however, is desirous of seeing what the aircraft position is relative to radio beams and other radio check points whereas the instructor 6 is primarily interested in the absolute position of the aircraft relative to other moving targets, to take off and destination points, or to observing the occurrence of events so as to monitor the procedure followed by the pilot in completing the flight.

The arrangement of FIG. 1 vividly illustrates the advantage of providing a single display apparatus 2 for viewing by two instructors who are interested in monitoring two completely different phases of flight training. The various crew stations shown in FIG. 2 provide information sources which aid the pilot in correct vision procedure. Whether in a commercial or military aircraft training device, the complexity of today's flight apparatus requires the display of several different flight parameters or events.

Figure 3:
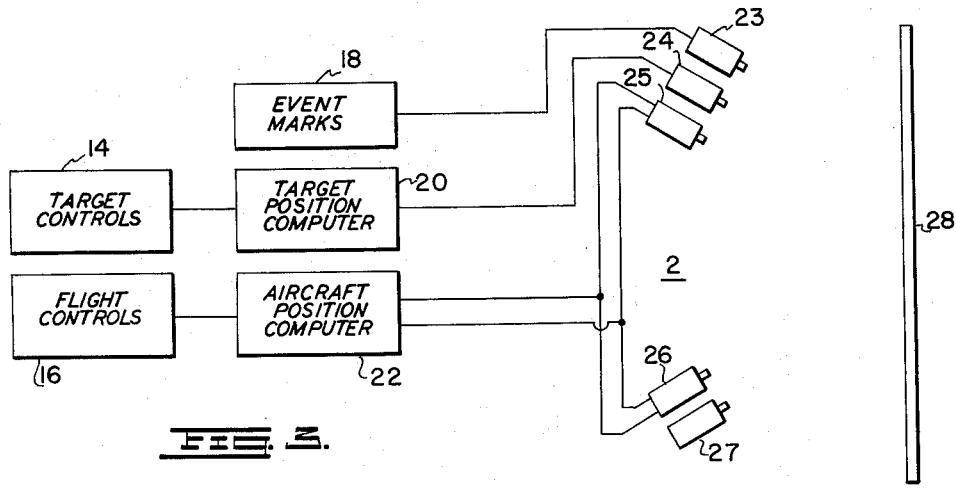
FIG. 3 is a block diagram schematic of the information fed to projectors which are focused upon a viewing screen.

FIG. 3 illustrates by schematic block diagram the preferred embodiment arrangement of projectors for carrying out the objects of the display apparatus. The instructor 6 is interested in observing the aircraft position during a simulated flight, the position of a target during simulated flight and the occurrence of various events during the flight while instructor 12 is interested in observing the aircraft's position in relation to radio beams. The arrangement of FIG. 3 will satisfy these requirements. Target controls 14, which may be operated either by instructor 6 or by another person, activate the target position computer 20 which applies positioning signals to projector 24 so as to provide target position information upon the viewing screen 28. Event marks generator 18 is used to feed projector 23 which is also focused upon the screen 28 at approximately the same angle as the projectors 24 and 25. Flight controls 16, operable by a flight trainee, affect the aircraft position computer 22 which, in turn, provides signals for aircraft position projection information from projectors 25 and 26. Projectors 23, 24, and 25 are so arranged that the information in being projected upon the viewing screen 28 is visible only by the instructor 6 since it is he who wishes to monitor the aircraft position, target position and event marks. Projector 27 projects a chart or map of the radio beams proximate to the simulated flight upon the screen 28 at an angle other than that projected by projectors 23, 24 and 25. Projector 26 projects the aircraft position information upon the screen 28 at the same angle as the map from projector 27 thereby allowing instructor 12 to observe the aircraft's position relative to radio beams and other navigational information present on the map.

A detailed description of FIG. 4 will be given hereafter. For our purposes at the moment it is sufficient to say that FIG. 4 is a schematic of the aircraft position computer 22 shown in FIG. 3. The purposes of this computer being to constantly compute the position of the aircraft within the range of the cordinates represented by the extremities of the plotting area 28.

In arranging the multiple display plotting system apparatus, it is seen that the navigational charts and plots seen will depend on the viewing angle. A person such as the instructor 12 seated directly in front of the screen 28 of the display apparatus 2 will see one display while a person such as the instructor 6 seated to one side will see a different display. This allows a single screen to be used to display to two instructors two separate simulation problems which are occurring simultaneously. One example of such a use would be where a navigational problem and a flight tactics problem are being run simultaneously in a weapons system trainer. Another example of this plotting system's usefulness would be for monitoring navigational and tactical problems during a commercial intercity flight.

Figure 5:
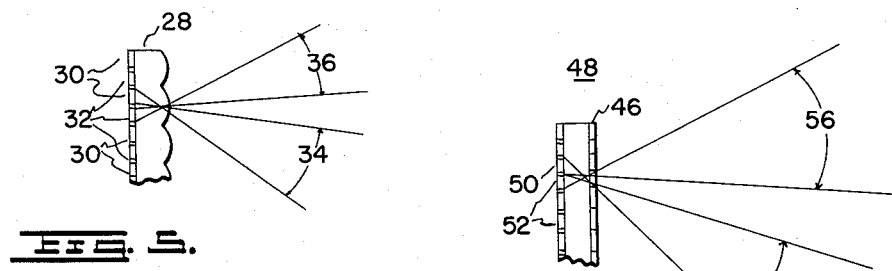
FIG. 5 is a cross sectional view of the viewing surface containing lenticular lenses.

To achieve the results desired in the preferred embodiment the viewing screen is fabricated so that its front surface is composed of many lenticular lenses preferably 40 to 60 to the inch. Navigational charts made up of line structures adhered to the rear surface of the viewing screen are positioned so that the individual lines of the chart will be in focus and magnified by the lenses. The lines and, hence, the chart seen will depend on the viewing angle as illustrated in FIG. 5. The line structure of a chart we shall designate as No. 1 is indicated as lines 30 while the line structure of chart 2 is indicated as elements 32. It is thus seen that the line stucture of chart 1 will be seen only from that area subscribed by the arc 34 set off between the projection lines while chart No. 2 will be visble only by persons within the arc 36. The resolution and viewing angle are both dependent upon the number of lenses per inch. Decreasing the number of lenses per inch increases the viewing angle but necessarily decreases the resolution. The images denoted as chart 1 and chart 2 may either be physical charts or projected images. In the preferred embodiment the navigator's map is attached to the rear of the viewing surface as one of the charts while the event marks, target and aircraft position indications are projected. The display surface preferably is transparent but must at least be translucent.

Figure 6:
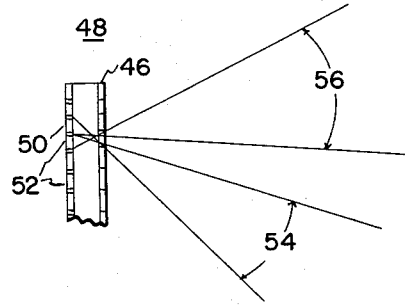
FIG. 6 is a top view of a presentation wherein two persons view two different views on the screen.
Figure 5:
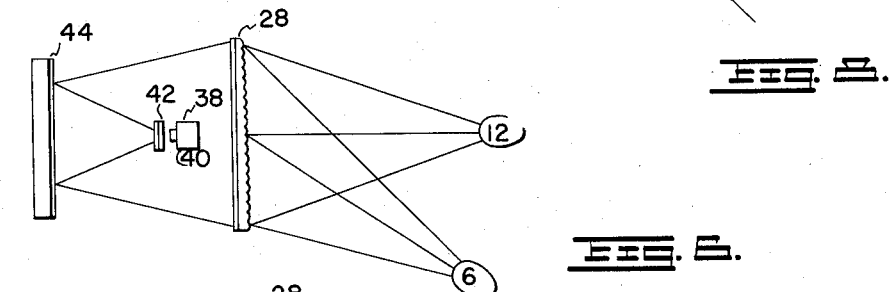
Figure 7:
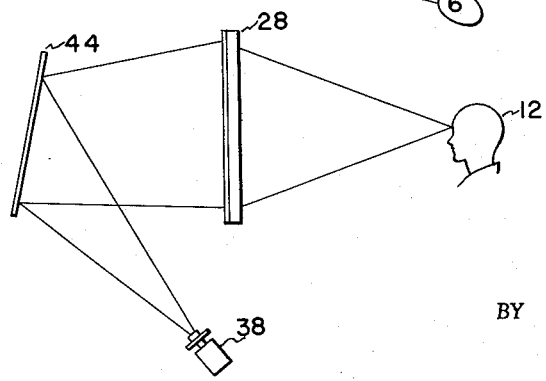
FIG. 7 is a side view of the arrangement shown in FIG. 6.

FIG. 6 is a top view of the preferred embodiment of this invention wherein projectors 38 and 40 project their separate images through a lens arrangement 42 upon a mirror surface 44 where the images are reflected at two different angles to the rear of the display surface 28. The instructor 12 may view the scene projected by one projector while the instructor 6 will observe only that scene projected by the other projector. The side view of this arrangement is shown in FIG. 7 wherein one projector 38 is shown to project a view upon the mirror 44 for observance by an instructor 12 upon the surface 28.

An alternate method for obtaining the same results utilizes the black line principle shown in FIG. 8 wherein the front surface 46 of the viewing screen 48 contains many equally spaced black lines. The charts or projected images to be viewed are again made up of line structures as were utilized in the embodiment which made use of the lenticular lenses. In the case of FIG. 8, however, the only lines to be observed are those not covered by the black lines on the front surface 46. The line structure of the charts and black line front surface are geometrically laid out in thickness and separation so that only the proper lines will be seen over a given subtended angle. In other words, the line structure of chart No. 1 is indicated or designated as numerals 50 while the line structure of chart 2 are designated 52, therefore, chart 1 would be visible only within the area subtended by the arc 54 while the information present upon chart No. 2 could be observed only by persons physically located within the arc area designated 56.

It is, therefore, seen that the multiple display plotting system herein shown and described may be used to solve any display problem wherein the simultaneous display of two separate events or phases of operation are desired. The displays are completely independent and co-existent as long as the persons wishing to observe the scene remain within the arc area of the scene they wish to view. The same principles may be expanded to display three or more separate images.

The aircraft position computer 22 shown in FIGS. 3 and 4 will now be described in more detail. Referring to FIG. 4, an air speed shaft 60 which is positioned in response to the operation of the pilot's controls moves the arm of potentiometer 62 so as to pick off a voltage proportional to air speed which is conducted to amplifier 64. This velocity analog voltage is resolved by resolver 66 on the flight path angle shaft 68 to yield a horizontal velocity component which is conducted to amplifier 70 and there, in turn, to plotting board heading resolver 72. The outputs of this resolver which indicate north-south and east-west velocities are conducted respectively to integrators 74 and 76 where they are summed with wind velocity voltages and integrated to yield aircraft position rectangular coordinates. The wind voltages are generated in the following manner. An instructor's wind velocity control 78 activates the mechanical shaft 80 so as to position the arm of potentiometer 82 to pick off a voltage proportional to the wind velocity. This voltage is conducted to amplifier 84 and, thence, to resolver 86 whose rotor is controlled by the instructor's wind direction control knob 88 which moves the resolver rotor by movement of the mechanical shaft 90. The output voltages from resolver 86 represent north-south and east-west wind velocities which are conducted to amplifiers 92 and 94 whose outputs are connected to resolver 96 whose rotor is driven by the Lambert correction angle shaft 98. The output voltages on conductors 99 and 100 which represent north-south and east-west wind velocities are then conducted to the integrators 74 and 76 where they are summed with the aircraft velocity voltages to produce a single velocity voltages which are integrated by the integrators 74 and 76 to yield output position shaft information to the counters and to potentiometers. The north-south integrator 74 drives the differential 102 to drive the north-south position shaft 104 which, in turn, positions the counter 106 from which the distance or rectangular coordinate in the north-south direction may be read directly and also positions the arm of potentiometer 108 and the rotors of resolvers 109 and 110 so as to yield north-south information for use in the flight simulator. The integrator 76 operates in the same manner to yield an east-west output in the same manner as the integrator 74 produced a north-south output. This aircraft position information may be utilized to drive a plotting pencil on a screen for projection by the projectors 25 and 26 or may be utilized by the mechanical shafts 104 and 114 to drive a scribe arrangement to mark the position of the aircraft relative to the coordinate extremities of the plotting board. One example of a plotting board to which the drive shafts 104 and 114 of FIG. 4 may be attached is shown in FIG. 2 of U.S. Patent No. 2,413,300 of December 31, 1946, to C. G. Dunn et al. which is hereby made a part of this specification. Individual target projectors are shown in FIG. 8 of this same patent and may be used to project the aircraft or target positions in the present invention.

It is therefore seen that one or more projectors, such as 23, 24 and 25, of FIG. 3 may be utilized from one angle to present upon a display surface information desired by one instructor while a portion of this information plus other information may be projected from projectors 26 and 27 to provide a display on the same plotting surface of information which is of importance only to a second instructor, there being no interference between the two views of two separate phases of training although viewed on a single screen.

It should be understood that this invention is not limited to specific details of construction and arrangement thereof herein illustrated and that changes and modifications may occur to one skilled in the art without departing from the spirit of the invention; the scope of the invention being set forth in the following claims.

What is claimed is:

1. Flight simulation display apparatus comprising a transparent display screen having vertical black lines upon one surface thereof, first projecting means focused upon the second surface of the screen at an angle to the screen so as to be visible within a first field of view proximate to the screen, computing means for calculating the positions of a simulated aircraft and a simulated target, the output of said computing means being connected to the said first projection means for controlling the presentation within the first field of view, second projection means focused upon the second surface of the screen at an angle to the screen so as to be visible within a second field of view proximate to the screen, said second projection means including chart projection means and said aircraft position computing means being connected to said second projection means for projecting an image of the chart and an indication of the simulated aircraft position upon the display surface for viewing within the said second field of view.

2. Flight simulation display apparatus comprising a transparent display screen having vertical black lines upon one surface thereof, first projecting means focused upon the second surface of the screen at an angle to the screen so as to be visible within a first field of view proximate to the screen, computing means for calculating the positions of a simulated aircraft and a simulated target, the outputs of said computing means being connected to the said first projection means for controlling the presentation within the first field of view, second projection means focused upon the second surface of the screen at an angle to the screen so as to be visible within a second field of view proximate to the screen, said second projection means including means for projecting a chart and said aircraft position computing means being connected to said second projection means for projecting an image of the chart and an indication of the simulated aircraft position upon the display surface for viewing within the said second field of view, the said first projecting means including separate projectors for the said simulated aircraft and simulated target.

3. Flight simulation display apparatus comprising a transparent display screen having vertical black lines upon one surface thereof, first projecting means focused upon the second surface of the screen at an angle to the screen so as to be visible within a first field of view proximate to the screen, first and second computing means for calculating the positions of a simulated aircraft and a simulated target respectively, the outputs of said computing means being conducted to the said first projection means for controlling the presentation within the first field of view, second projection means focused upon the second surface of the screen at an angle to the screen so as to be visible within a second field of view proximate to the screen, and chart means and said aircraft position computing means being connected to said second projection means for projecting an image of the chart and an indication of the simulated aircraft position upon the display surface for viewing within the said second field of view, the said first projecting means including separate projectors connected individually to said computing means for the said simulated aircraft and simulated target, and the said second projection means including one projector connected to the chart means for displaying an image of the chart and another projector connected to the aircraft computing means for displaying an indication of simulated aircraft position.

References Cited in the file of this patent

UNITED STATES PATENTS

| 758,117 | Snook | Apr. 26, 1904 |
| 2,562,077 | Winnek | July 24, 1951 |
| 2,661,651 | Stipek | Dec. 8, 1953 |
| 2,683,389 | Wright | July 13, 1954 |
| 2,878,585 | Steiner | Mar. 24, 1959 |

FOREIGN PATENTS

| 134,739 | Australia | Oct. 18, 1949 |